United States Patent
Hayashi et al.

(10) Patent No.: US 6,889,002 B1
(45) Date of Patent: May 3, 2005

(54) RECORDING MEDIUM ON WHICH NAVIGATION INFORMATION IS RECORDED AND INFORMATION REPRODUCING APPARATUS THEREFOR

(75) Inventors: Katsuyoshi Hayashi, Kawagoe (JP); Kenichiro Yano, Kawagoe (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/315,980

(22) Filed: May 21, 1999

(30) Foreign Application Priority Data

May 22, 1998 (JP) ............................................ 10-140723

(51) Int. Cl.[7] .............................................. H04N 5/781
(52) U.S. Cl. ...................................... 386/126; 369/94
(58) Field of Search ............................ 386/45, 125–126; 369/94, 30.03, 30.04; 701/200–226; H04N 5/783

(56) References Cited

U.S. PATENT DOCUMENTS

| | | | | |
|---|---|---|---|---|
| 5,274,560 A | * | 12/1993 | LaRue | 701/202 |
| 6,118,927 A | * | 9/2000 | Kikuchi et al. | 386/125 |
| 2002/0176695 A1 | * | 11/2002 | Sawabe et al. | 386/125 |
| 2003/0028319 A1 | * | 2/2003 | Khavakh et al. | 701/209 |

* cited by examiner

*Primary Examiner*—Thai Tran
(74) *Attorney, Agent, or Firm*—Morgan Lewis & Bockius LLP

(57) ABSTRACT

A recording medium and an information reproducing apparatus capable of quickly reading navigation information are offered. The recording medium has a plurality of recording layers, on each of which navigation information is recorded. Navigation information having a same attribute is recorded in same one of the plurality of recording layers.

17 Claims, 3 Drawing Sheets

RECORDING MEDIUM ON WHICH NAVIGATION INFORMATION IS RECORDED AND INFORMATION REPRODUCING APPARATUS THEREFOR

This Application claims the benefit of Japanese Application No. 10-140723 filed on May 22, 1998, which is hereby incorporated by reference.

FIELD OF THE INVENTION

The present invention relates to a recording medium for storing navigation information used to guide routes for a vehicle and to an information reproducing apparatus or drive for reading the navigation information from the recording medium. More particularly, the invention relates to a recording medium having a plurality of recording layers for storing navigation information and to an apparatus or drive for reading the navigation information from this recording medium.

DESCRIPTION OF THE RELATED ART

In recent years, many vehicles have been fitted with a navigation system that displays a map containing the current position of the vehicle. Often, the amount of navigation information stored in the system, containing map information corresponding to the map for navigation processing is exorbitant. However, since an in-vehicle navigation system is installed in a vehicle, the navigation system needs to be as small as possible.

Accordingly, navigation systems are now available that use a DVD disc, which has a storage capacity 7 times greater than a compact disc (CD), to store the navigation information necessary for navigation processing. This system is designed so that the navigation information is read from the DVD disc as the need arises.

DVD discs that have a plurality of recording layers (e.g., two recording layers) to store an increased amount of information are known. However, when navigation information is recorded at random on such DVD discs, it takes an excessively long time to play back the navigation information. In order to shift the focal position of a light beam in the system from one recording layer to another, a series of operations are necessary, including opening the focus servo loop, searching for the focal position, pulling-in the focus servo, and closing the focus servo loop. Therefore, if navigation information is recorded randomly across a plurality of recording layers, the focal point must frequently shift across the plurality of recording layers. This makes it impossible to read desired navigation information with sufficient speed.

Even when the focal point of the optical beam is shifted within one recording layer to read navigation information, a series of operations is necessary, including opening the tracking servo loop, searching for the focal position, pulling-in the tracking servo, and closing the tracking servo loop. Therefore, if the necessary navigation information is stored at random on this single recording layer, the focal point within this recording layer shifts frequently, rendering it impossible to play back desired navigation information in a short time.

SUMMARY OF THE INVENTION

The present invention is directed to a recording medium that substantially obviates one or more of the problems due to limitation and disadvantages of the related art.

An object of the present invention is to provide a recording medium and an information reproducing apparatus capable of quickly reading necessary navigation information.

Additional features and advantages of the invention will be set forth in the description which follows, and in part will be apparent from the description or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a recording medium of the present invention has a plurality of recording layers, on each of which a plurality of navigation information is recorded, wherein navigation information having a same attribute is recorded in a same one of the plurality of recording layers.

In another aspect, a recording medium has a plurality of recording layers in which there are a plurality of areas and on each of which navigation information is recorded, wherein navigation information having a same attribute is recorded in the same area of each of the plurality of recording layers.

In a further aspect, an information reproducing apparatus for reproducing information from a recording medium having a plurality of recording layers, on each of which navigation information is recorded, wherein navigation information having a same attribute is recorded in the same one of the plurality of recording layers, and the apparatus comprises means for emitting a light beam for reading the navigation information from the recording medium, focus control means for controlling the position of the light beam in a focus direction, tracking control means for controlling the position of the light beam in a tracking direction, and reproduction means for reproducing the navigation information on the basis of the reflected light beam from each of the recording layers of the recording medium.

In a still further aspect, an information reproducing apparatus for reproducing information from a recording medium having a plurality of recording layers in which there a plurality of areas and on each of which navigation information is recorded, wherein navigation information having a same attribute is recorded in a same area of each of the plurality of recording layers, and the apparatus comprises means for emitting a light beam for reading the navigation information from the recording medium, focus control means for controlling the position of the light beam in a focus direction, tracking control means for controlling the position of the light beam in a tracking direction, and reproduction means for reproducing the navigation information on the basis of the reflected light beam from each of the recording layers of the recording medium.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

A preferred embodiment of the invention relates to a DVD disc read by an in-vehicle navigation system, which assists a driver. The DVD disc acts as a recording medium in which map data and other data are stored. The structure and operation of the in-vehicle navigation system in accordance with the present invention are first described by referring to FIG. 1.

Figure 1:
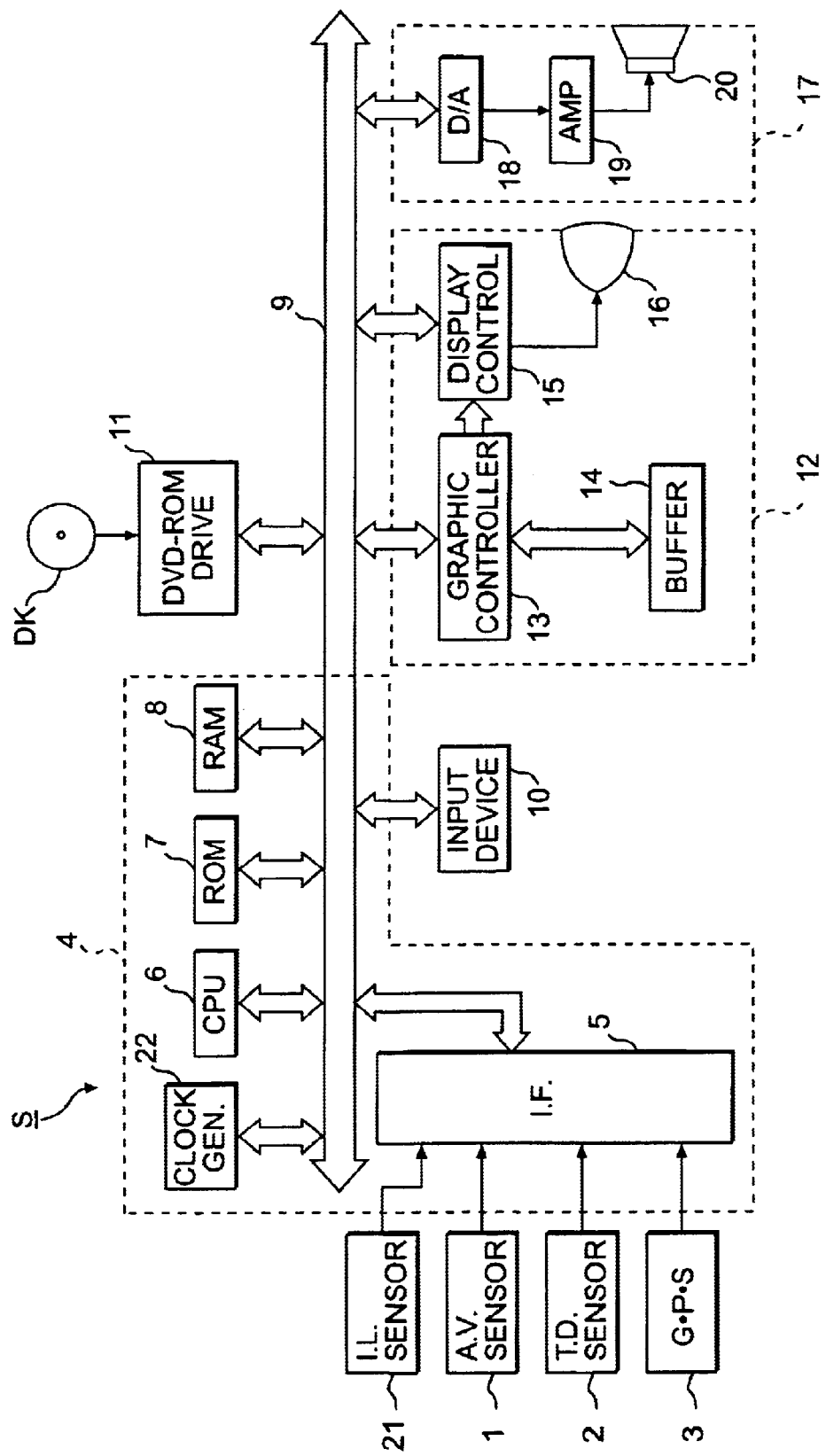
FIG. 1 is a block diagram schematically showing the structure of an in-vehicle navigation system in accordance with an embodiment of the present invention.

In FIG. 1, the in-vehicle navigation system S comprises an angular velocity sensor 1, a traveled distance sensor 2, a GPS receiver 3, an illumination lamp sensor 21, a system controller 4, an input device 10 such as a remote controller for entering various kinds of data, a DVD-ROM drive (also known as a DVD-ROM player) 11, a display unit 12 for displaying various kinds of data under control of the system controller 4, and a sound reproduction unit 17 for playing back various sound and voice data under control of the system controller 4.

The angular velocity sensor 1 detects the angular velocity of the vehicle when it makes a turn, and produces data about the angular velocity and the relative azimuth. The traveled distance sensor 2 counts the number of pulses in pulse signals produced as the vehicle wheels rotate and thus calculates the number of pulses per revolution of each vehicle wheel. The sensor 2 produces data about the distance traveled, based on the number of pulses per revolution. The GPS (Global Positioning System) receiver 3 receives radio waves from GPS satellites and produces GPS data. In addition, the GPS receiver 3 produces data about the absolute direction of movement of the vehicle. The system controller 4 controls the whole navigation system according to the data about the relative azimuth, the angular velocity, and the traveled distance, as well as GPS data used for determination of locations and data about the absolute azimuth. The illumination lamp sensor 21 detects whether an illumination lamp such as an illumination of an in-vehicle instrument (e.g., a speedometer) is lit up. The DVD-ROM drive 11 reads various kinds of data, such as road data including the number of lanes and road widths, and also reads a control program for execution of navigation processing from the DVD disc DK, under control of the system controller 4.

The system controller 4 comprises an interface 5 for connection with an external sensor such as the GPS receiver 3, a CPU 6 for controlling the whole system controller 4, a ROM (read-only memory) 7 loaded with a fundamental control program for controlling the system controller 4, a RAM (random access memory) 8 having a nonvolatile memory (not shown), and a clock generator 22 for measuring the present time based on the time data derived from the GPS satellites and received by the GPS receiver. The RAM 8 is loaded with various kinds of data, such as data about a route previously established by the user via the input device 10, such that the data can be read out. The input device 10, the DVD-ROM drive 11, the display unit 12, and the sound reproduction unit 17 are connected via a bus line 9.

The display unit 12 comprises a graphic controller 13, a buffer storage 14, and a display control portion 15 for controlling display provided on a display unit 16, such as a liquid-crystal panel or CRT, according to image data produced from the graphic controller 13. This graphic controller 13 controls the whole display unit 12 according to control data sent from the CPU 6 via the bus line 9. The buffer storage 14 consists of a VRAM (video RAM) or the like and temporarily holds image information that can be immediately displayed.

The sound reproduction unit 17 comprises a digital-to-analog converter 18 for converting digital audio data sent from the DVD-ROM drive 11 or the RAM 8 via the bus line 9 into an analog signal, an amplifier 19 for amplifying the analog audio signal from the D/A converter 18, and a loudspeaker 20 for converting the amplified analog audio signal into an audible sound.

Figure 2:
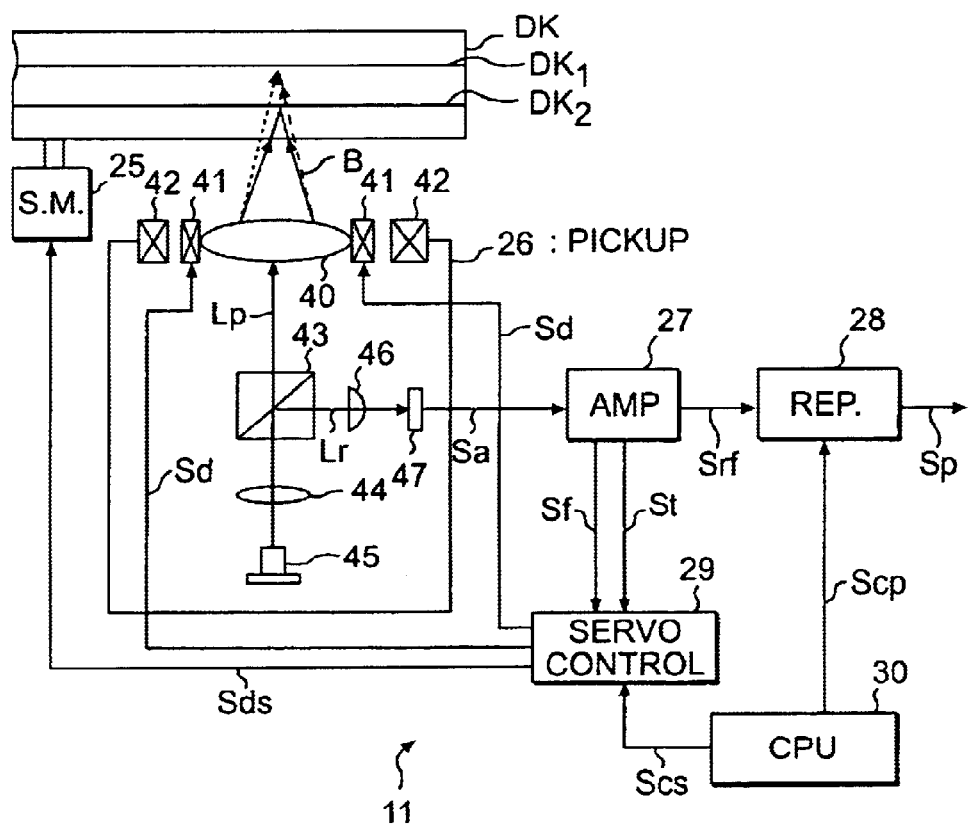
FIG. 2 is a block diagram of a DVD-ROM drive incorporated in the navigation system shown in FIG. 1.

Next, the structure and operation of the DVD-ROM drive 11, which reads data recorded on the DVD-ROM disc DK, are described in detail by referring to FIG. 2. As shown in FIG. 2, the DVD-ROM drive 11 comprises a spindle motor 25, a pickup 26, an amplifier 27, a reproduction portion 28 serving as a reproduction means, a servo control portion 29 acting as a focus control means and a tracking control means, and a CPU 30.

The pickup 26 comprises an objective lens 40, a pair of coils 41 mounted around the objective lens 40, a pair of magnets 42, a polarized beam splitter 43, a collimator lens 44, a semiconductor laser 45 acting as an illumination means, a multilens 46, and a detector 47.

The DVD disc DK in accordance with the present embodiment has two recording layers, $DK_1$ and $DK_2$, and stores various kinds of navigation data in a data structure. The operation of each component of the DVD-ROM drive in corresponding navigation information is described below.

When navigation data is read from the DVD disc DK, the semiconductor laser 45 first emits a reading optical beam Lp. This beam Lp is collimated by the collimator lens 44, passes through the polarized beam splitter 43, and reaches the objective lens 40. The beam is then focused by the objective lens 40 and impinges as light beam B on either recording layer $DK_1$ or $DK_2$.

The coil 41 mounted around the objective lens 40 is excited with a servo drive signal Sd (described later) and interacts with the magnet 42 to control the focal point of the light beam B in the direction of focus (i.e., to determine which of the recording layers is illuminated with the light beam B) and to control the focal point in the direction of tracking (i.e., to determine the illuminated position within the selected recording layer).

The plane of polarization of the light beam B is rotated by either recording layer and the light beam B is reflected. The reflected light Lr is then reflected by the polarized beam splitter 43 and received by the detector 47 via the multilens 46. The multilens 46 is provided for giving astigmatism to the reflected light Lr to generate a focus error signal Sf (described later).

Then, the received reflected light Lr is converted into an electrical signal Sa by the detector 47 and sent to the amplifier 27. The amplifier 27 separates an RF signal Srf that is indicative of program stored in the DVD disc DK, tracking error signal St that is used for tracking servo control, and a focus error signal Sf that is used for focus servo control, from the output signal Sa from the detector 47. The RF signal Srf is sent to the reproduction portion 28. The tracking error signal St and the focus error signal Sf are separately supplied to the servo control portion 29.

The reproduction portion 28 reproduces the information or program recorded in the DVD disc DK from the RF signal Srf, based on the control signal Scp from the CPU 30. The reproduction portion 28 then outputs a reproduction signal Sp to the bus line 9.

The servo control portion 29, which receives the tracking error signal St and the focus error signal Sf, drives the objective lens 40 in the direction of focus or in the direction of tracking according to the control signal Scs from the CPU 30, the tracking error signal St, and the focus error signal Sf. The servo control portion 29 generates the drive signal Sd to carry out servo control for focusing or tracking, and supplies the drive signal Sd to the coil 41.

Thus, the objective lens 40 is driven parallel to the DVD disc DK (i.e., in the tracking direction) or vertical to the disc (i.e., in the focus direction), and the tracking servo control or focus servo control is carried out.

Concurrently, the servo control portion 29 creates a spindle drive signal Sds according to the control signal Scs from the CPU 30 to drive the spindle motor 25. The spindle drive signal Sds is sent to the spindle motor 25. When navigation data is read from the DVD disc DK, the spindle motor 25 rotates the DVD disc DK in response to the spindle drive signal Sds.

During the operation described above, the servo control portion 29 provides the aforementioned focus servo control to focus the light beam B onto the recording layer specified by the CPU 30. Furthermore, the servo control portion 29 carries out the tracking servo control to move the focus of the light beam B to the position of the recording layer where data to be read is recorded. That is, in each servo control, the servo control portion 29 shifts the focus of the light beam either in the direction of focus (where the focus is moved from one recording layer to another) or in the direction of tracking (where a shift is made within one recording layer).

A series of operations is necessary when the focus is moved in the direction of focus, including opening the focus servo loop, searching for the focal position, pulling-in the focus servo, and closing the focus servo loop. Also, when the focus is shifted in the direction of tracking, a series of operations is necessary, including opening the tracking servo loop, searching for the focal position, pulling-in the tracking servo, and closing the tracking servo loop.

Figure 3:
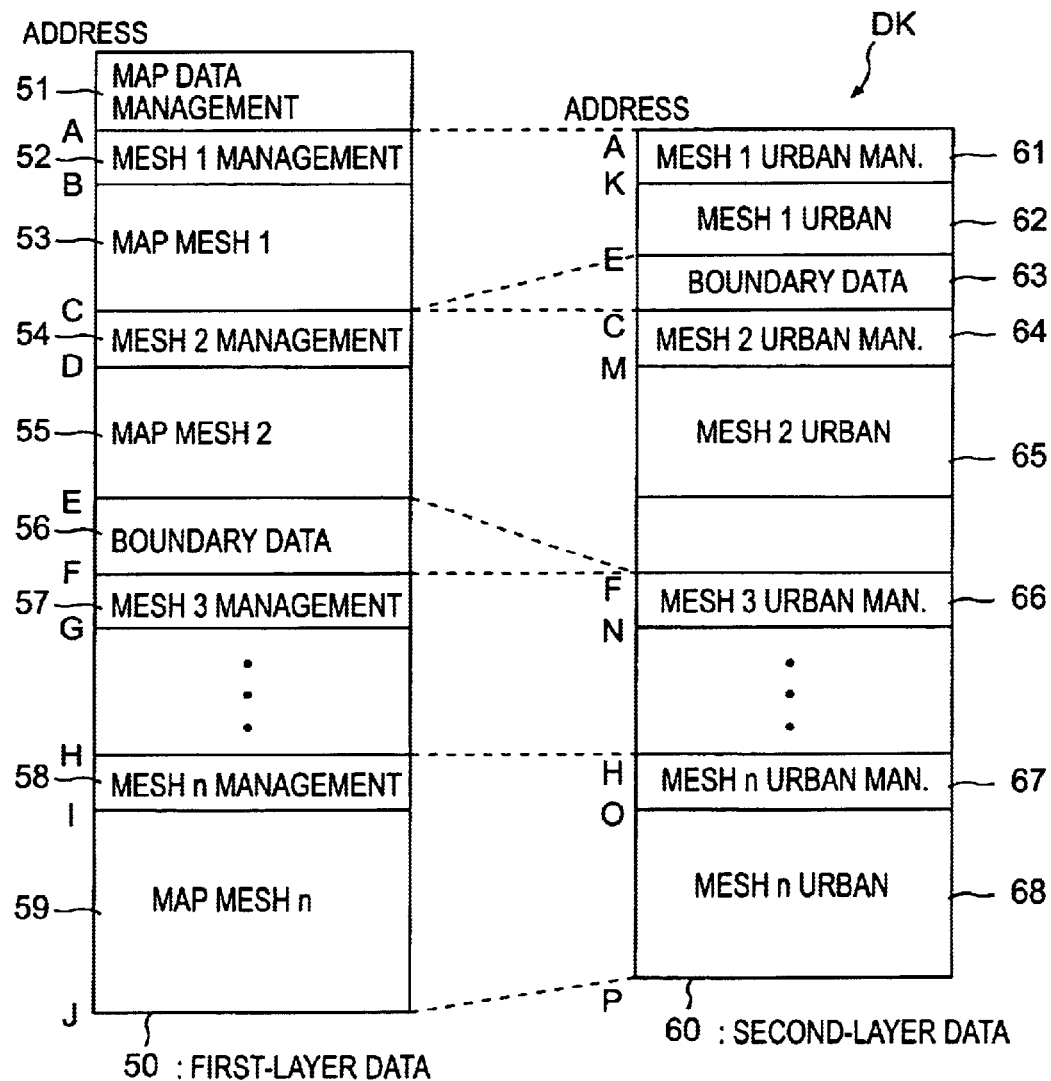
FIG. 3 is a diagram illustrating a data structure in each of the recording layers of a DVD disc in accordance with an embodiment of the present invention.

The data structure of the recording layers in accordance with the present invention is described next by referring to FIG. 3. In FIG. 3, data about a map at a smaller scale that covers a wider area is recorded on the recording layer $DK_1$, while data about a detailed map at a greater scale that covers a narrow area (e.g., a urban map) is recorded on the recording layer $DK_2$.

For example, with respect to the map data recorded on the recording layers, the whole country of Japan is divided into map meshes having a given area (e.g., 1-kilometer square). Each individual map mesh is recorded on the recording layers.

As shown in FIG. 3, first-layer data 50 recorded on the recording layer $DK_1$ contains map data management data 51, map mesh 1 data 53, map mesh 1 management data 52, map mesh 2 data 55, map mesh 2 management data 54, map mesh 3 management data 57, . . . , map mesh n data 59 and map mesh n management data 58. The map data management data 51 is management information about the whole map data recorded on the recording layer $DK_1$. The map mesh 1 data 53 is data corresponding to an area indicated by the first map mesh. The map mesh 1 management data 52 is management information about the map mesh 1 data 53. The map mesh 2 data 55 is data corresponding to an area indicated by the second map mesh. The map mesh 2 management data 54 is management data about the map mesh 2 data 55. The map mesh 3 management data 57 is a management data about a map mesh 3 data (not shown) corresponding to an area indicated by the third map mesh. The map mesh n data 59 is data corresponding to an area indicated by the nth map mesh The map mesh n management data 58 is management information about the map mesh n data 59.

The map mesh 1 indicated by the data 53, the map mesh 2 indicated by the data 55, . . . , and the map mesh n indicated by the data 59, all of which are recorded on the recording layer $DK_1$, are drawn at the same scale.

Second-layer data 60 recorded on the recording layer $DK_2$ contains map mesh 1 urban map data 62, map mesh 1 urban map management data 61, map mesh 2 urban map data 65, map mesh 2 urban map management data 64, map mesh 3 urban map management data 66, . . . , map mesh n urban map data 68, and map mesh n urban map management data 67. The map mesh 1 urban map data 62 is data about a magnified urban map corresponding to the first map mesh described above. The map mesh 1 urban map management data 61 is management information about the map mesh 1 urban map data 62. The map mesh 2 urban map data 65 is data about a magnified urban map corresponding to an area indicated by the second map mesh. The map mesh 2 urban map management data 64 is management data about the map mesh 2 urban map data 65. The map mesh 3 urban map management data 66 is management information about the map mesh 3 urban map data. The map mesh 3 urban map (not shown) is a magnified map corresponding to an area indicated by the third map mesh. The map mesh n urban map data 68 is data about a magnified urban map corresponding to an area indicated by the nth map mesh. The map mesh n urban map management data 67 is management information about the map nth mesh urban map data 68.

The map mesh 1 urban map data 62, the map mesh 2 urban map data 65, . . . , and the map mesh n urban map data 68, all of which are recorded on the recording layer $DK_2$, are drawn at a common scale, which is greater than the scale of the map indicated by the map mesh 1 data 53.

With respect to the physical positions (addresses) of the data on the recording layers, addresses of management data about each of the map meshes are common to both recording layers $DK_1$ and $DK_2$.

That is, a start address A of the map mesh 1 management data 52 on the recording layer $DK_1$ is the same as a start address A of the map mesh 1 urban map management data 61 on the recording layer $DK_2$. A start address C of the map mesh 2 management data 54 on the recording layer $DK_1$ is the same as a start address C of the map mesh 2 urban map management data 64 on the recording layer $DK_2$. A start address F of the map mesh 3 management data 57 on the recording layer $DK_1$ is the same as a start address F of the map mesh 3 urban map management data 66 on the recording layer $DK_2$. A start address H of the map mesh n management data 58 on the recording layer $DK_1$ is the same as a start address H of the map mesh n urban map management data 67 on the recording layer $DK_2$.

To bring the start addresses of the management data into agreement with each other, boundary data 56 and 63, which are dummy data, are inserted into the corresponding positions within the first-layer data 50 and the second-layer data 60.

As described thus far, maps at the same scale are all recorded on each of the recording layers $DK_1$ and $DK_2$ of the DVD disc DK in accordance with the present embodiment.

Therefore, when data about the maps at the same scale are read out, it is not necessary to shift the illuminated position of the light beam B across plural recording layers. Hence, the map data can be quickly read out.

Maps corresponding to the same mesh and drawn at different scales are recorded in the same regions of the overlapping recording layers $DK_1$ and $DK_2$. Therefore, when maps belonging to the same mesh and drawn at different scales are read in succession, it is not necessary to shift the illuminated position of the light beam B within the same recording layer. The maps can be reproduced in succession simply by switching the illuminated position in focus direction. Thus, maps can be reproduced quickly.

In the embodiment described above, maps drawn at the same scale are all recorded on the same recording layer and maps belonging to the same mesh but drawn at different scales are recorded in the same region of the plural recording layers. Data can be recorded with combinations as given in Table 1 below.

TABLE 1

| Recording layer $DK_1$ | Recording layer $DK_2$ |
| --- | --- |
| data on maps of Eastern Japan | data on maps of Western Japan |
| data for search for route | data for search for locations |
| map data & map-related voice data | other voice data |
| data for operations on commands | data for voice-recognition operations |
| data for youngsters | data for the elderly |
| data for males | data for females |
| data for high-quality-oriented persons | data for low-cost-oriented persons |
| data for families | data for couples |
| map data | data for search for route & data for search for locations |
| map data | voice data |
| map data & voice data for route guidance | voice data for voice-recognition operation |

In each example described in Table 1, data having the same attribute is recorded on the same recording layer.

In the first example, data about maps of Eastern Japan are all recorded in the first region of the recording layer $DK_1$, and data about maps of Western Japan are all recorded in the second region of the recording layer $DK_2$. With this configuration, data about maps to be read almost successively are all recorded on the same recording layer and so it is not necessary to switch the focal point from the recording layer $DK_1$ to $DK_2$, for example, during playback. Consequently, the maps can be reproduced quickly.

In the second example, data used for search for routes, i.e., for setting an optimum route to a destination, can all be recorded on the recording layer $DK_1$. Data used for search for locations, e.g., names, addresses and categories thereof, can all be recorded on the recording layer $DK_2$. With this configuration, search data can be quickly played back by suppressing the number of switches of the focal point between the recording layers during playback, as it is unlikely that maps are searched for desired locations while searching for routes.

In the third example, map data and voice data associated with the map data can all be recorded on the recording layer $DK_1$. Voice data independent of maps can all be recorded on the recording layer $DK_2$. With this configuration, when navigation processing is performed using voice, voice data used during display of maps are present on the same recording layer as map data about the maps. Therefore, it is not necessary to shift the focal point between the recording layers when associated voice data are reproduced while displaying the maps. Hence, voice data can be reproduced quickly.

Furthermore, in the fourth example, data about commands for operations can all be recorded on the recording layer $DK_1$ while data about voice recognition can all be recorded on the recording layer $DK_2$. When navigation processing is performed using voice and voice recognition operation, operations based on other commands are not usually carried out. Therefore, in this configuration, the number of switches of the focal point between the recording layers is restricted during playback, and data about the operations can be quickly reproduced.

In the fifth example, data about locations adapted for youngsters, such as amusement arcades, can all be recorded on the recording layer $DK_1$. Data adapted for the elderly, e.g., data about vaudeville theaters, Shinto shrines, and Buddhist temples, can be recorded on the recording layer $DK_2$ in an easily understandable form. With this configuration, the number of switches of the focal point between the recording layers during playback is limited, because it is unlikely that data used for both youngsters and elderly are employed at the same time. Hence, their respective data can be quickly reproduced.

In the sixth example, data about locations generally favored by males, such as pinball saloons, baseball grounds, horse race tracks, etc., can all be recorded on the recording layer $DK_1$, and data about locations generally favored by females, such as museums, theaters, etc., can all be recorded on the recording layer $DK_2$. With this configuration, the number of switches of the focal point between the recording layers during playback is limited, because it is unlikely that data used for both males and females are employed at the same time. Hence, their respective data can be quickly reproduced.

In the seventh example, data adapted for persons favoring high-quality restaurants and big-name brand product shops can all be recorded on the recording layer $DK_1$, and data adapted for persons favoring economical shops and restaurants can all be recorded on the recording layer $DK_2$. With this configuration, two kinds of data adapted for those favoring high-quality products and those favoring inexpensive products, respectively, are rarely used at the same time. Therefore, the number of switches of the focal point between the recording layers during playback is limited. Consequently, their respective data can be quickly reproduced.

In the eighth example, data adapted for families such as data about amusement parks, and recreation grounds are all recorded on the recording layer $DK_1$, and data adapted for couples such as data about favorite destinations for dating couples can all be recorded on the recording layer $DK_2$. With this structure, the number of switches of the focal point between the recording layers during playback is limited, because these two kinds of data are rarely used simultaneously. Consequently, their respective data can be quickly reproduced.

In the ninth example, map data can all be recorded on the recording layer $DK_1$, and data used for route searches and data used for location searches can all be recorded on the recording layer $DK_2$. With this structure, the number of switches of the focal point between the recording layers during playback is limited, because these two kinds of data are rarely used simultaneously. Consequently, their respective data can be quickly reproduced.

In the tenth example, map data can all be recorded on the recording layer $DK_1$, and voice data can all be recorded on the recording layer $DK_2$. With this structure, the number of switches of the focal point between the recording layers during playback is limited, because voice data is not frequently used when no route guidance is carried out. Consequently, their respective data can be quickly reproduced.

Finally, in the eleventh example, map data and voice data for route guidance can all be recorded on the recording layer $DK_1$, and voice data for voice-recognition operation can all be recorded on the recording layer $DK_2$. With this structure, the number of switches of the focal point between the recording layers during playback is limited, because these two kinds of data are rarely used simultaneously. Consequently, their respective data can be quickly reproduced.

As a matter of course, this invention is not limited to the above mentioned embodiment and examples described in Table 1. For instance, any combination of each example can arbitrarily be made.

As described above, according to the present invention, navigation information having a same attribute is recorded in one of the plurality of recording layers. Therefore, desired navigation information can be reproduced quickly.

It will be apparent to those skilled in the art that various modification and variations can be made in the recording medium and the information reproducing apparatus of the present invention without departing from the spirit or scope of the invention. Thus, it is intended that the present invention cover the modification and variations of this invention provided they come within the scope of the appended claims and their equivalents.

What is claimed is:

1. An information reproducing apparatus for reproducing information from a recording medium having a plurality of recording layers respectively read at different focal points, wherein navigation information is recorded on each of the plurality of recording layers, and wherein navigation information having a same attribute is recorded in a same one of the plurality of recording layers, the apparatus comprising:

means for emitting a light beam for reading the navigation information from the recording medium;

focus control means for controlling a position of the light beam in a focus direction;

tracking control means for controlling the position of the light beam in a tracking direction; and reproduction means for reproducing the navigation information on the basis of a reflected light beam from each of the recording layers of the recording medium.

2. The apparatus according to claim 1, wherein the navigation information includes first map data corresponding to a first area and second map data corresponding to a second area that is different from the first area, and wherein the first map data is recorded on one of the recording layers, and the second map data is recorded on another one of the plurality of recording layers.

3. The apparatus according to claim 1, wherein the navigation information includes map data corresponding to a plurality of scales, and wherein map data having a same scale is recorded on the same one of the plurality of recording layers.

4. The apparatus according to claim 1, wherein the navigation information includes route search data and location search data, and wherein the route search data is recorded on one of the plurality of recording layers and the location search data is recorded on another one of the plurality of recording layers.

5. The apparatus according to claim 1, wherein the navigation information includes map data, voice data associated with the map data, and voice data independent of map data, and wherein the map data and the voice data associated with the map data are recorded on one of the plurality of recording layers and the voice data independent of the map data is recorded on another one of the plurality of recording layers.

6. The apparatus according to claim 1, wherein the navigation information includes map data and voice data, and wherein the map data is recorded on one of the plurality of recording layers and the voice data is recorded on another one of the plurality of recording layers.

7. An information reproducing apparatus for reproducing information from a recording medium having a plurality of recording layers respectively read at different focal points, wherein navigation information is recorded on each of the plurality of recording layers, and wherein navigation information having a same attribute is recorded in a same area of each of the plurality of recording layers, the apparatus comprising:

means for emitting a light beam for reading the navigation information from the recording medium;

focus control means for controlling a position of the light beam in a focus direction;

tracking control means for controlling the position of the light beam in a tracking direction; and reproduction means for reproducing the navigation information on the basis of a reflected light beam from each of the recording layers of the recording medium.

8. The apparatus according to claim 7, wherein the navigation information includes first map data corresponding to an area at a first scale and second map data corresponding to the area at a second scale that is different from the first scale, and wherein the first map data and the second map data are recorded on one of the recording layers and another one of the recording layers, respectively, in the same area.

9. A recording medium readable by a navigation system to provide navigation information for a map, comprising:

a plurality of recording layers respectively read at different focal points, a plurality of navigation information is stored on each of the plurality of recording layers, wherein a plurality of navigation information for maps having a same attribute are recorded on a same one of the plurality of recording layers and is readable by the navigation system.

10. The recording medium according to claim 9, wherein the plurality of navigation information includes route search data and location search data, and wherein the route search data is recorded on one of the plurality of recording layers and the location search data is recorded on another one of the plurality of recording layers.

11. The recording medium according to claim 9, wherein the plurality of navigation information includes map data, voice data associated with the map data, and voice data independent of map data, and wherein the map data and the voice data associated with the map data are recorded on one of the plurality of recording layers and the voice data independent of the map data is recorded on another one of the plurality of recording layers.

12. The recording medium according to claim 9, wherein the plurality of navigation information includes map data and voice data, and wherein the map data is recorded on one of the plurality of recording layers and the voice data is recorded on another one of the plurality of recording layers.

13. The recording medium of claim 9, wherein navigation information for a first map is stored on a first area of a first recording layer and other navigation information is stored on the first area of a second recording layer.

14. The recording medium of claim 9, wherein the same attribute is map scale.

15. A recording medium readable by a navigation system to provide navigation information for a map, comprising:

a plurality of recording layers respectively read at different focal points, a plurality of navigation information is stored on each of the plurality of recording layers for a plurality of maps;

a plurality of areas on each of the recording layers, wherein each one of the plurality of navigation information for one of the plurality of maps is in a same area of at least two of the plurality of recording layers and is readable by the navigation system.

16. The recording medium of claim 15, wherein the plurality of navigation information comprises:

first map data having a first map scale for a first region; and second map data having a second map scale for a first region, wherein the first map data is recorded in a first area of a first recording layer and the second map data is recorded in a first area of a second recording layer.

17. The recording medium of claim 16, wherein the plurality of navigation information comprises:

first map data having a first map scale for a first region; and second map data having at least one of location data and voice data corresponding to the first region, wherein the first map data is recorded in a first area of a first recording layer and the second map data is recorded in a first area of a second recording layer.

* * * * *